(12) United States Patent
Chen et al.

(10) Patent No.: US 11,795,352 B2
(45) Date of Patent: Oct. 24, 2023

(54) (METH)ACRYLATE ADHESIVE COMPOSITION

(71) Applicant: BenQ Materials Corporation, Taoyuan (TW)

(72) Inventors: Wen-Chun Chen, Taoyuan (TW); Yan-Chiuan Liou, Taoyuan (TW); Pao-Hsun Wu, Taoyuan (TW); Yi-Ting Tseng, Taoyuan (TW); Chung-Han Lee, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 631 days.

(21) Appl. No.: 17/076,892

(22) Filed: Oct. 22, 2020

(65) Prior Publication Data
US 2021/0348040 A1 Nov. 11, 2021

(30) Foreign Application Priority Data
May 6, 2020 (TW) .................. 109115007

(51) Int. Cl.
*C09J 133/08* (2006.01)
*C08F 220/14* (2006.01)
*C08F 220/18* (2006.01)
*C08F 230/08* (2006.01)
*C08F 2/38* (2006.01)

(52) U.S. Cl.
CPC .............. *C09J 133/08* (2013.01); *C08F 2/38* (2013.01); *C08F 220/14* (2013.01); *C08F 220/1802* (2020.02); *C08F 220/1803* (2020.02); *C08F 220/1804* (2020.02); *C08F 230/085* (2020.02); C09J 2203/318 (2013.01); C09J 2203/354 (2020.08)

(58) Field of Classification Search
CPC .............. C08F 230/085; C08F 220/14; C08F 220/1802; C08F 220/1803; C08F 220/1804; C08F 220/1805; C08F 220/1806; C08F 2/38; C08F 4/04; C09J 133/066; C09J 133/08; C09J 2203/318; C09J 2203/354
See application file for complete search history.

(56) References Cited

U.S. PATENT DOCUMENTS

2001/0036986 A1* 11/2001 Matsumura .......... C09D 183/08
524/265

FOREIGN PATENT DOCUMENTS

JP S63291969 A 11/1988
JP 3434295 B2 * 8/2003

* cited by examiner

*Primary Examiner* — Mark S Kaucher

(57) ABSTRACT

The present disclosure relates to a (meth)acrylate adhesive composition comprising a (meth)acrylated polymer, a cross-linking agent and a silane copolymer, wherein the silane copolymer comprises 70 to 95 weight parts of an acrylate monomer containing $C_1$-$C_4$ alkyl group and 5 to 30 weight parts of a silane represented by the following formula (I):

$$X\!-\!R^1\!-\!SiR^2_{3-a}(OR^3)_a \qquad (I)$$

wherein the weight-average molecular weight of the silane copolymer is ranging from 40,000 to 150,000. The silane copolymer can enhance the initial adhesion strength, rework ability and weather resistance of the (meth)acrylate adhesive composition. Furthermore, the (meth)acrylate adhesive composition can be used in the flexible optical film with a good bending restoring property and adhesion.

14 Claims, No Drawings

(METH)ACRYLATE ADHESIVE COMPOSITION

CROSS-REFERENCE TO RELATED APPLICATION

This application claims the priority benefit of Taiwanese Application Serial Number 109115007, filed on May 6, 2020, which is incorporated herein by reference.

TECHNICAL FILED

The present invention relates to a (meth)acrylate adhesive composition for an optical film, and more particularly to a (meth)acrylate adhesive composition with a good adhesion and rework ability.

BACKGROUND OF THE INVENTION

With the increasingly development of display technology, a variety of optical films, such as polarizers, compensation films and brightness enhancement films, have been applied to displays to achieve display effects and enhance display quality.

Polarizers are one of the main optical components of liquid crystal displays and organic light emitting diode (OLED) displays which are obtained from the substrate of the display panel bonded a polarizer that with an adhesive layer on the surface. According to the different application of the display, the adhesive layer used for the polarizer needs to provide appropriate adhesion. For example, the display used in the car or in the outdoors needs to face the severe usage environments and therefore both good adhesion and weather resistance of the adhesive layer used for the polarizer are needed. Furthermore, when the polarizer is attached to the display panel, the correct position of the optical axis of the polarizer need to be ensured, so if fitting defects are found after the attachment, the polarizer must be easily removed from the display substrate and avoid the damage cause by tearing off. Thus, the adhesive layer is expected to have proper peel ability to meet the requirements of rework ability.

In the state of related art, the adding of silane-based compounds to adhesive compositions are widely been proposed, for example, adding epoxy-containing silane-based compounds into adhesive compositions, but the adhesion thereof may increase excessively at high temperature and humidity and therefore remain of the adhesive on the substrate may occur during tearing off at rework procedure. Another example is the addition of cyanoacetyl-containing silane-based compounds in adhesive compositions, although the adhesion thereof will not increase excessively at high temperature and humidity thereby the good rework ability of adhesive compositions can be obtained, but relatively poor initial adhesion strength and weather resistance of this kind of adhesive are also showed.

The addition of polysiloxane compounds, organosilicon compounds, polyoxyalkylenes and additives composition of acrylate to (meth)acrylate adhesive compositions to enhance the adhesion of the adhesive are also been proposed. However, after the polarizer is attached to the substrate, the adhesion of the acrylate adhesive will increase over time, which may reduce the rework ability of the polarizer.

Furthermore, with the development of flexible display devices, the flexible display device contains a composite structure of multiple optical films laminated with adhesive generally, and because of the different mechanical modulus of each different optical films, the endure of the bending stress of each optical films during the folding of the device are distinct. Therefore, in addition to the sufficient mechanical properties of each optical films should be demanded, the adhesive between each film layer needs to have the release and absorbing ability of the bending stress and also the sufficient adhesion, which can prevent each film layer from peeling off during the bending, causing damage to the flexible display device. Accordingly, the adhesive used in the flexible display device needs to provide good flexibility and adhesion, and no creep will occur.

SUMMARY OF THE INVENTION

The present invention provides a (meth)acrylate adhesive composition for lamination of optical film and substrate, comprising a (meth)acrylate polymer, a crosslinking agent and a siloxane copolymer, wherein the siloxane copolymer comprises acrylic monomers and silane compounds. In the present (meth)acrylate adhesive composition, the siloxane copolymer comprises the acrylic monomers of polarity compatible with the (meth)acrylate polymer, and silane compounds with the function of enhancing the adhesion to the substrate; therefore the initial adhesion strength and weather resistance of the (meth)acrylate adhesive composition can be enhanced, and the adhesion thereof will not increase over time, which can provide the rework ability of the adhesive required for the manufacturing process. Moreover, when the present (meth)acrylate adhesive composition is used in the flexible display device, it can provide good flexibility without creep, and excellent adhesion.

The present invention provides a (meth)acrylate adhesive composition for lamination of optical film and substrate, comprising a (meth)acrylate polymer, a crosslinking agent and a siloxane copolymer, wherein the siloxane copolymer comprises 70 to 95 weight percent of the acrylic monomers with $C_1$-$C_4$ alkyl group and 5 to 30 weight percent of the silane compound represented by the following formula (I):

$$X-R^1-SiR^2_{3-a}(OR^3)_a \qquad (I)$$

wherein X is an acrylic group or (meth)acrylic group, $R^1$ is an $C_1$-$C_8$ alkyl group alkyl group or alkoxy group, $R^2$ and $R^3$ is an $C_1$-$C_4$ alkyl group respectively, a is an integer of 1 to 3, and the weight-average molecular weight of the siloxane copolymer is ranging between 40,000 and 150,000, wherein the usage amount of the siloxane copolymer is between 0.2 parts to 25 parts by weight per hundred parts by weight of the (meth)acrylate polymer.

In an embodiment of the present invention, the glass transition temperature of the siloxane copolymer can ranging between −22° C. and −40° C.

In an embodiment of the present invention, the difference between the glass transition temperature of the siloxane copolymer and the glass transition temperature of the (meth)acrylate polymer can ranging between 3° C. and 15° C.

In an embodiment of the present invention, the silane compound represented by formula (I) can be 3-(Methacryloxy)propyltrimethoxysilane.

In an embodiment of the present invention, the siloxane copolymer can comprises a butyl acrylate and an acrylate monomer selected from one of the group consisting of methyl acrylate, ethyl acrylate and propyl acrylate, and the ratio of the usage amount of the butyl acrylate to the acrylate monomer is ranging between 0.6 and 1.5.

In an embodiment of the present invention, the weight-average molecular weight of the siloxane copolymer can ranging between 50,000 and 140,000.

In an embodiment of the present invention, the siloxane copolymer can further comprises a chain transfer agent.

In an embodiment of the present invention, the (meth) acrylate polymer comprises a (meth)acrylate monomer and a crosslinkable monomer.

In an embodiment of the present invention, the amount of the (meth)acrylate monomers is ranging between 90 to 99.8 weight percent and preferably ranging between 94 to 99.5 weight percent of the total amount of the (meth)acrylate monomers and the crosslinkable monomers.

In an embodiment of the present invention, the amount of the crosslinkable monomers is ranging between 0.2 to 10 weight percent and preferably ranging between 0.5 to 6 weight percent of the total amount of the (meth)acrylate monomers and the crosslinkable monomers.

In an embodiment of the present invention, the (meth) acrylate polymer can further comprises a free radical reactive monomer, wherein the amount of the free radical reactive monomers is ranging between 0.5 to 10 parts by weight per hundred parts by weight of the (meth)acrylate monomers and the crosslinkable monomers.

The present (meth)acrylate adhesive composition provides good initial adhesion strength and weather resistance, and the adhesion thereof will not increase over time, which can provide the rework ability of the adhesive required for the manufacturing process.

The present (meth)acrylate adhesive composition can be used to laminated the composite structure of flexible display device, and provides release and absorbing ability of the bending stress between each film layer, which achieve the good flexibility without creep, and the excellent adhesion.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylic acid" used herein refers methacrylic acid and acrylic acid", "(meth)acrylate" refers to acrylate or methacrylate, and "(meth)acrylamide" refers to methacrylamide and acrylamide.

The present invention provides a (meth)acrylate adhesive composition, comprising a (meth)acrylate polymer, a crosslinking agent and a siloxane copolymer, wherein the siloxane copolymer comprises 70 to 95 weight percent of the acrylic monomers with $C_1$-$C_4$ alkyl group and 5 to 30 weight percent of the silane compound represented by the following formula (I):

$$X\text{—}R^1\text{—}SiR^2_{3-a}(OR^3)_a \qquad (I)$$

wherein X is an acrylic group or (meth)acrylic group, $R^1$ is an $C_1$-$C_8$ alkyl group or alkoxy group, $R^2$ and $R^3$ is an $C_1$-$C_4$ alkyl group respectively, a is an integer of 1 to 3, and the weight-average molecular weight of the siloxane copolymer is ranging between 40,000 and 150,000, wherein the usage amount of the siloxane copolymer is between 0.2 parts to 25 parts by weight per hundred parts by weight of the (meth) acrylate polymer.

In the present (meth)acrylate adhesive composition, the siloxane copolymer comprises the acrylic monomers of polarity compatible with the (meth)acrylate polymer, and silane compounds with the function of enhancing the adhesion to the substrate. Because of the interaction forces between siloxane copolymer and (meth)acrylate polymer are weak bonding forces such as hydrogen bonding forces or van der Waals forces, the initial adhesion strength of the (meth)acrylate adhesive composition will not be affected by adding of siloxane copolymer, and when the (meth)acrylate adhesive is applied to the polarizer for attaching to the display panel, the difference of polarity between the siloxane copolymer and the (meth)acrylate polymer will drive the siloxane copolymer slowly move to the surface of the substrate of the display panel and react with substrate surface, filling the pores of the substrate to moderately decrease adhesion of the (meth)acrylate adhesive composition. Therefore, the present (meth)acrylate adhesive composition can provide better initial adhesion strength, good rework ability required for the manufacturing process and the adhesion which will not raise significantly over time, thereby both stable adhesion and weather resistance can be obtained.

Moreover, because the glass transition temperature of the (meth)acrylate adhesive composition affects the applicability and the process operation performance thereof, the glass transition temperature of each components of the (meth) acrylate adhesive composition needs to be considered, to obtain the adhesive composition with desired glass transition temperature. In the present (meth)acrylate adhesive composition, the gap between the glass transition temperature of the siloxane copolymer and the glass transition temperature of the (meth)acrylate polymer is ranging between 3° C. and 15° C. and preferably between 3° C. and 12° C.

In the present (meth)acrylate adhesive composition, the glass transition temperature of the siloxane copolymer can be adjusted by the select of acrylic monomers. In a preferred embodiment of the present invention, the siloxane copolymer comprises butyl acrylate and an acrylate monomer selected from one of the group consisting of methyl acrylate, ethyl acrylate and propyl acrylate, and the ratio of the usage amount of the butyl acrylate to the acrylate monomers is ranging between 0.6 and 1.5. The present (meth)acrylate adhesive composition can be used in optical displays for laminating of functional optical films such as polarizers in optical displays, the glass transition temperature of the siloxane copolymer can be adjusted by selecting appropriate acrylic monomers, and is ranging between −22° C. and −40° C. and preferably between −25° C. and −35° C.

In a preferred embodiment of present (meth)acrylate adhesive composition, the weight-average molecular weight of the siloxane copolymer is ranging between 50,000 and 140,000.

In a preferred embodiment of present (meth)acrylate adhesive composition, the silicon atom in the siloxane copolymer represented by formula (I) is bonded to at least one alkoxy group (—OR$^3$), and is particularly preferably bonded to 1 to 3 $C_1$-$C_4$ alkoxy groups. In a preferred embodiment of siloxane copolymer of the present invention, the suitable silane compound is particularly 3-(Methacryloxy)propyltrimethoxysilane.

The method for preparing siloxane copolymer of the present (meth)acrylate adhesive composition comprises the steps of, dissolving the acrylic monomers and the silane compound represented by formula (I) in a solvent under inert gas atmosphere, adding the initiator to trigger the polymerization.

The suitable initiator of the preparing the present siloxane copolymer can be selected from those commonly used in the related art, such as, but not limited to, Azo initiator, such as 2,2'-azobis (2-methylbutyronitrile), 2,2'-azobisisobutyronitrile, 2,2'-azobis(2,4-dimethylvaleronitrile), dimethyl-2,2'-Azobis(2-methylpropionic acid) an the like, preferably 2,2'-azobisisobutyronitrile; and peroxide-based initiator, such as benzene peroxide formaldehyde, laurel peroxide, didecanoyl peroxide or the like.

The solvents suitable for preparation of the present siloxane copolymer can be the organic solvents commonly used in the related art, such as ethyl acetate, butyl acetate, methyl ethyl ketone, methyl isobutyl ketone, cyclohexanone, toluene, xylene or the like.

In another preferred embodiment of present (meth)acrylate adhesive composition, the siloxane copolymer may further comprises a chain transfer agent to control the molecular weight thereof. The chain transfer agent used in the present siloxane copolymer can be those commonly known in the related art, such as, aliphatic mercaptans, for example, n-dodecyl mercaptan; and xanthogen disulfide, for example, diisopropyl xanthate disulfide, but not limited thereto.

The present (meth)acrylate adhesive composition can comprises (meth)acrylate polymer, crosslinking agent, siloxane copolymer, and optional appropriate additives.

The (meth)acrylate polymer of the present (meth)acrylate adhesive composition can comprises (meth)acrylate monomers and crosslinkable monomers.

The suitable (meth)acrylate monomers of the present (meth)acrylate polymer can be the (meth)acrylate monomers containing linear, branched or cyclic $C_1$-$C_{12}$ alkyl group, alkoxy group or aryloxy group, such as methyl (meth)acrylate, ethyl (meth)acrylate, n-propyl (meth)acrylate, isopropyl (meth)acrylate, (meth) N-butyl acrylate, second butyl (meth)acrylate, third butyl (meth)acrylate, amyl (meth)acrylate, n-hexyl (meth)acrylate, cyclohexyl (meth)acrylate, 2-ethylhexyl (meth)acrylate, n-octyl (meth)acrylate, isooctyl (meth)acrylate, isononyl (meth)acrylate, lauryl (meth)acrylate, tetradecyl acrylate, cyclopentyl (meth)acrylate, cyclohexyl (meth)acrylate (meth), phenyl (meth)acrylate, phenoxyethyl acrylate, phenoxy (meth)acrylate propyl acrylate, phenoxybutyl (meth)acrylate, phenoxydiethylene glycol (meth)acrylate, 2-hydroxy-3-phenoxypropyl (meth) acrylate, (meth)cresyl acrylate, polystyrene (meth)acrylate or the combination thereof. The amount of the (meth) acrylate monomers is ranging between 90 to 99.8 weight percent and preferably ranging between 94 to 99.5 weight percent of the total amount of the (meth)acrylate monomers and the crosslinkable monomers.

The suitable crosslinkable monomers of the present (meth)acrylate polymer can be the monomers containing carboxylic acid group or hydroxyl group, such as, but not limited to, acrylic acid, (meth)acrylic acid, 2-hydroxyethyl (meth)acrylate, 3-hydroxypropyl (meth)acrylate, 4-hydroxybutyl (meth)acrylate, (meth)acrylic acid chloride 2-hydroxypropyl ester or the combination thereof, preferably 2-hydroxyethyl acrylate or 4-hydroxybutyl acrylate. The amount of the crosslinkable monomers is ranging between 0.2 to 10 weight percent and preferably ranging between 0.5 to 6 weight percent of the total amount of the (meth)acrylate monomers and the crosslinkable monomers.

In an embodiment of present invention, the (meth)acrylate polymer can be obtained by dissolving the acrylic monomers and the crosslinkable monomers in a solvent under inert gas atmosphere and adding the initiator to trigger the polymerization, wherein the initiator can be azobisisobutyronitrile, 2,2'-azobis(2,4-dimethylvaleronitrile), azobisisoheptonitrile, dimethyl-2,2'-azobis(2-methyl Propionic acid), benzoyl peroxide, laurel peroxide or didecanoyl peroxide; and the suitable solvent can be organic solvent, such as ethyl etate, butyl acetate, methyl ethyl ketone, methyl isobutyl ketone, cyclohexanone, toluene, xylene or the like.

In the present (meth)acrylate polymer, in addition to (meth)acrylate monomers and crosslinkable monomers, it can optionally comprises free radical reactive monomers, for example, vinyl monomers, such as, but not limited to, vinyl acetate, styrene or the like. The amount of the free radical reactive monomers is ranging between 0.5 to 10 parts by weight and preferably ranging between 0.5 to 5 parts by weight per hundred parts by weight of the (meth)acrylate monomers and the crosslinkable monomers.

The weight-average molecular weight of the present (meth)acrylate polymer can be ranging between 500,000 to 1,800,000 and preferably ranging between 800,000 to 1,500,000, and the glass transition temperature thereof can be ranging between −60° C. to 0° C. and preferably ranging between −50° C. and −20° C.

In an embodiment of present invention, (meth)acrylate polymer and siloxane copolymer are polymerized in a solvent in the presence of a crosslinking agent. Wherein, the crosslinking agent for polymerization can be isocyanate compounds, amine compounds, epoxy compounds, metal chelate compounds or the combination thereof. The suitable isocyanate-based crosslinking agent can be, such as, toluene diisocyanate and trimer thereof, hydrogenated toluene diisocyanate, toluene diisocyanate adduct of trimethylolpropane, xylylene diisocyanate of trimethylpropane adducts, trimethylene methane triisocyanate, isophorone diisocyanate, diphenylmethane diisocyanate, hexamethylene diisocyanate, m-xylylene diisocyanate, 1,3-bis(methyl isocyanate)cyclohexane, 4,4'-diisocyanate dihexylmethane or the like; the suitable amine-based crosslinking agent can be, such as, hexamethylene diamine, polyethyleneimine, hexamethylene tetramine, diethylene ethylenetriamine, ethylenetetramine, isophorone diamine, amine-based resin or melamine resin; the suitable epoxy-based crosslinking agent can be, such as, ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidyl aniline, diglycidyl amine, N,N,N',N'-tetraglycidyl-m-xylene diamine, bisphenol F diglycidyl ether or 1,3-bis(N,N'-Diglycidylaminomethyl)cyclohexane; the suitable metal chelate crosslinking agent can be, such as, but not limited to, the polyvalent metal chelates that formed from acetylacetone and iron, copper, zinc, tin, titanium, zirconium or magnesium.

In an embodiment of present invention, the amount of the crosslinking agent is ranging between 0.1 parts to 25 parts by weight and preferably ranging between 0.5 parts to 20 parts by weight per hundred parts by weight of the (meth) acrylate polymer.

The suitable solvents for the polymerization reaction can be organic solvents, such as, but not limited to, methyl ethyl ketone, acetone, acetylacetone, ethyl acetate, tetrahydrofuran, cyclohexanone, n-hexane, toluene, xylene or the combinations thereof.

The present adhesive composition can further comprises a silane coupling agent to adjust adhesion, for example, silicon compound containing epoxy structure, such as 3-glycidoxypropyltrimethoxysilane, 3-glycidoxypropyltriethoxysilane, 2-(3,4-epoxycyclohexyl)ethyltrimethoxysilane or the like.

The present adhesive composition can further comprises the additives commonly used in the related art optionally, such as antistatic agents, ultraviolet absorbers, antioxidants, plasticizers, fillers, colorant, pigment or the like.

The present (meth)acrylate adhesive composition can be applied to the substrate surface with the desired thickness by the method such as, roll coating, comma coating, dip coating, spinning coating or slot-die coating, and the adhesive layer can be obtained after the coated substrate is dried and aged. When the adhesive layer is used for the lamination of the polarizer and the display panel, it can provide excellent initial adhesion strength, good weather resistance and rework ability.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

EXAMPLE

Preparation Example 1: Preparation of Siloxane Copolymer I 90 parts by weight of n-butyl acrylate, 90 parts by weight of methyl acrylate, 20 parts by weight of 3-(Methacryloxy) propyltrimethoxysilane (KBM-503, available from Shin-Etsu Chemical Co., Ltd., Japan), 1 part by weight of n-dodecyl mercaptan, 216 parts by weight of ethyl acetate and 59 parts by weight of butyl acetate were mixed and purged nitrogen to remove oxygen to form solution A. 1.6 parts by weight of azodiisoheptonitrile (ADVN), 24 parts by weight of ethyl acetate and 1 part by weight of butyl acetate were mixed, heated to 90° C., and added to the solution A. When the reaction was completed, the reaction product of a siloxane copolymer I with a solid content of 40%, a weight-average molecular weight of 64,000 and a glass transition temperature of −36.19° C. was obtained.

Preparation Example 2: Preparation of Siloxane Copolymer II 50 parts by weight of n-butyl acrylate, 50 parts by weight of methyl acrylate, 30 parts by weight of 3-(Methacryloxy) propyltrimethoxysilane (KBM-503) and 90 parts by weight of methyl ethyl ketone were mixed and purged nitrogen to remove oxygen to form solution B. 0.3 parts by weight of azobisisobutyronitrile (AIBN) and 20 parts by weight of methyl ethyl ketone were mixed, heated to 85° C., and added to the solution B. When the reaction was completed, the reaction product was diluted with ethyl acetate to obtain a siloxane copolymer II with a solid content of 50%, a weight-average molecular weight of 133,600 and a glass transition temperature of −32.48° C.

Preparation Example 3: Preparation of Siloxane Copolymer III

A siloxane copolymer was prepared in the same manner as in Preparation Example 2, except the amount of the 3-(Methacryloxy)propyltrimethoxysilane was 20 parts by weight and the amount of the methyl ethyl ketone was 78 parts by weight, and a siloxane copolymer III with a weight-average molecular weight of 133,600 and a glass transition temperature of −32.48° C. was obtained.

Preparation Example 4: Preparation of Siloxane Copolymer IV

A siloxane copolymer was prepared in the same manner as in Preparation Example 2, except the amount of the 3-(Methacryloxy)propyltrimethoxysilane was 10 parts by weight and the amount of the methyl ethyl ketone was 70 parts by weight, and a siloxane copolymer IV with a weight-average molecular weight of 117,000 and a glass transition temperature of −30.71° C. was obtained.

Example 1: Preparation of Adhesive Composition 72 parts by weight of n-butyl acrylate, 30 parts by weight of methyl acrylate, 5 parts by weight of vinyl acetate, 1 part by weight of acrylic acid, 0.5 parts by weight of 2-hydroxyethyl methacrylate (2-HEMA) and 163 parts by weight of ethyl acetate were mixed and purged nitrogen to remove oxygen. After purging nitrogen for 0.5 hours, azobisisobutyronitrile (AIBN) of the amount of 0.5 parts by weight was added to the solution. When the reaction was completed, the reaction product was diluted with ethyl acetate to obtain a (meth)acrylate polymer with a solid content of 30%, a weight-average molecular weight of 954,000 and a glass transition temperature of −24.59° C.

7 parts by weight of isocyanate crosslinking agent (D-262, available from Mitsui Chemicals, Inc., Japan), 2 parts by weight of aluminum acetylacetonate (CA190T, available from Xunhe Industrial Co., Ltd., Taiwan), 1.5 parts by weight of bisphenol F diglycidyl ether (EPALLOY 8820, available from CVC Thermoset Specialties, USA), 0.05 parts by weight of silane coupling agent (KR516, available from Shin-Etsu Chemical Co., Ltd., Japan) and 0.23 parts by weight of siloxane copolymer I were added to the 100 parts by weight of (meth)acrylate polymer and mixed evenly to obtain the (meth)acrylate adhesive composition.

The obtained (meth)acrylate adhesive composition was applied to a release film, and the coated film was dried at 95° C. to obtain an adhesive layer of the thickness of 20 μm. The adhesive layer was attached to one side surface of the polarizer, and after 5 days aging at room temperature, the adhesion and weather resistance were determined in accordance with the measurement described hereinafter. The test results were shown in Table 1.

Adhesion measurement: The polarizer was cut into a size of 25 mm×200 mm and attached to a glass substrate after removing the release film thereon. The test samples were placed at a room temperature for 7 days, 60° C. for 4 hours, and 60° C. and 90% relative humidity (RH) for 24 hours respectively, and measured according to the test method of JIS Z 0237, rolling and bonding the test samples with a 2 kg roller, and after 20 minutes, measuring the adhesion by a tension machine at a tensile speed of 300 mm/min and an angle of 180. The adhesion test result of the test sample after being placed at room temperature for 7 days can be regarded as a judgment of rework ability.

Weather resistance evaluation: The polarizer was cut into a size of 312.4 mm×176.95 mm and attached to a glass substrate after removing the release film thereon. The test sample was placed at 60° C. and 90% relative humidity (RH) for 500 hours, and was checked if the attached polarizer had bonding failure with the glass substrate. If there was no bonding failure such as bubbling, peeling or cracking, it was marked as "0"; if there was any bonding failure such as bubbling, peeling or cracking, it was marked as "X".

TABLE 1

The test results of the adhesive composition obtained from Example 1

|   |   | Example 1 |
|---|---|---|
| Adhesion (gf/25 mm) | Initial | 179 |
|  | Room temperature, 7 days | 364 |
|  | 60° C., 4 hours | 318 |
|  | 60° C./90% RH, 24 hours | 793 |
| Weather resistance |  | ◯ |

As shown in Table 1, the (meth)acrylate adhesive composition of Example 1 provides an appropriate adhesion, and still meets the requirements of rework ability even after 7 days. The (meth)acrylate adhesive composition obtained from Example 1 also provides an appropriate adhesion after been placed at high temperature and humidity, and doesn't show any bonding failure after being placed at 60° C. and 90% relative humidity (RH) for 500 hours, and behaves good high temperature and humidity resistance.

Example 2: Preparation of Adhesive Composition 65 parts by weight of n-butyl acrylate, 15 parts by weight of methyl acrylate, 20 parts by weight of 2-phenoxy ethyl acrylate (2-PHEA), 2 part by weight of acrylic acid, 1 parts by weight of 2-hydroxyethyl methacrylate (2-HEMA) and 150 parts by weight of ethyl acetate (EAC) were mixed, purged nitrogen to remove oxygen and heated to 65° C., and azobisisobutyronitrile (AIBN) of the amount of 0.6 parts by weight was added to the solution. When the reaction was completed, the reaction product was diluted with ethyl acetate to obtain a (meth)acrylate polymer with a solid content of 20%, a weight-average molecular weight of 1,450,000 and a glass transition temperature of −22° C.

0.2 parts by weight of diisocyanate-trimethylolpropane (TDI-TMP) (AD75, available from SAPICI SpA, Italy), 0.3 parts by weight of epoxy-based crosslinking agent (Tetrad-C, available from Mitsubishi Gas Chemical Company, Japan) and 0.09 parts by weight of siloxane copolymer III were added to the 100 parts by weight of (meth)acrylate polymer and mixed evenly to obtain the (meth)acrylate adhesive composition.

The obtained (meth)acrylate adhesive composition was applied to a release film, and the coated film was dried at 95° C. to obtain an adhesive layer of the thickness of 25 μm. The adhesive layer was attached to one side surface of the polarizer and after 5 days aging at room temperature to obtain the test samples, and the adhesion and weather resistance of the test samples were determined according to the test method of Example 1. The testing time of the adhesion test at room temperature, in addition to 7 days, were extended to 14 days, 21 days and 28 days, and the testing time of the adhesion test at 60° C. and 90% relative humidity (RH) was changed to 16 hours. The test results were shown in Table 2.

Example 3: Preparation of Adhesive Composition

A (meth)acrylate adhesive composition was prepared in the same manner as in Example 2, except that the amount of the siloxane copolymer II was 0.36 parts by weight. The obtained (meth)acrylate adhesive composition was made into test samples of polarizer as the same manner as the Example 2, and the adhesion and weather resistance of the test samples were determined according to the test method of Example 2. The test results were shown in Table 2.

Example 4: Preparation of Adhesive Composition

A (meth)acrylate adhesive composition was prepared in the same manner as in Example 2, except that the amount of the siloxane copolymer III was 0.36 parts by weight. The obtained (meth)acrylate adhesive composition was made into test samples of polarizer as the same manner as the Example 2, and the adhesion and weather resistance of the test samples were determined according to the test method of Example 2. The test results were shown in Table 2.

Example 5: Preparation of Adhesive Composition

A (meth)acrylate adhesive composition was prepared in the same manner as in Example 2, except that the amount of the siloxane copolymer IV was 0.36 parts by weight. The obtained (meth)acrylate adhesive composition was made into test samples of polarizer as the same manner as the Example 2, and the adhesion and weather resistance of the test samples were determined according to the test method of Example 2. The test results were shown in Table 2.

Comparative Example 1

A (meth)acrylate polymer was prepared in the same manner as in Example 2. 100 parts by weight of the obtained (meth)acrylate polymer, 0.2 parts by weight of the toluene diisocyanate-trimethylolpropane (TDI-TMP) (AD75), 0.3 parts by weight of the epoxy-based crosslinking agent (Tetrad-C), 0.1 parts by weight of the silane additives (KBM-403, available from Shin-Etsu Chemical Co., Ltd., Japan) and 0.05 parts by weight of the silane additives (KBM-503) were mixed evenly to obtain a (meth)acrylate adhesive composition.

The obtained (meth)acrylate adhesive composition was made into test samples of polarizer as the same manner as the Example 2, and the adhesion and weather resistance of the test samples were determined according to the test method of Example 2. The Test Results were Shown in Table 2.

TABLE 2

The test results of Examples 2 to 5 and Comparative Example 1

| | | Comparative Example 1 | Example 2 | Example 3 | Example 4 | Example 5 |
|---|---|---|---|---|---|---|
| Adhesion (gf/25 mm) | Initial | 242 | 618 | 561 | 884 | 1608 |
| | 7 days | 1260 | 227 | 411 | 464 | 709 |
| | 14 days | 1859 | 231 | 470 | 467 | 587 |
| | 21 days | 2246 | 263 | 530 | 491 | 692 |
| | 28 days | 2350 | 211 | 462 | 473 | 532 |
| | 60° C., 4 hours | 1317 | 350 | 497 | 564 | 1190 |
| | 60° C./90% RH 16 hours | 1700 | 292 | 489 | 548 | 924 |
| Weather resistance | | ○ | ○ | ○ | ○ | ○ |

As shown in Table 2, the initial adhesions of Example 2 to 5 are better than that of Comparative Example 1, and the adhesions over 7 days to 28 days of Example 2 to 5 tend to be stable, which meet the requirements of rework ability. The (meth)acrylate adhesive composition of Example 2 to 5 also provides appropriate adhesions after being placed in an environment of high temperature and high humidity, and doesn't show any bonding failure after being placed at a temperature of 60° C. and relative humidity (RH) of 90% for 500 hours, and behaves good high temperature and humidity resistance. The adhesion of the Comparative Example 1 increases substantially over time which results in increasing of rework difficulty.

Example 6: Preparation of Adhesive Composition 50 parts by weight of n-butyl acrylate, 50 parts by weight of 2-ethylhexyl acrylate, 10 parts by weight of methyl acrylate, 5 parts by weight of acrylic acid, 1 parts by weight of 2-hydroxyethyl methacrylate (2-HEMA) and 66.7 parts by weight of ethyl acetate (EAC) were mixed, purged nitrogen to remove oxygen and heated to 85° C., and azobisisobutyronitrile (AIBN) of the amount of 0.1 parts by weight was added to the solution. When the reaction was completed, the reaction product was diluted with ethyl acetate to obtain a (meth)acrylate polymer with a solid content of 30%, a weight-average molecular weight of 878,000 and a glass transition temperature of −35.85° C.

0.3 parts by weight of diisocyanate-trimethylolpropane (TDI-TMP) (AD75), 0.2 parts by weight of zirconium metal chelate (K-KAT 4205, available from King Industries, USA) and 0.2 parts by weight of siloxane copolymer II of Preparation Example 2 were added to the 100 parts by weight of (meth)acrylate polymer and mixed evenly to obtain the (meth)acrylate adhesive composition.

The obtained (meth)acrylate adhesive composition was used to prepare an optical laminate film for a flexible display, the optical laminate film was consisting of a polarizer of 33 μm, a first optical compensation film of 2 μm and a second optical compensation film of 2 μm in sequence, and each layer was bonded with the obtained (meth)acrylate adhesive composition of 5 μm. The optical laminate film was attached to a polyester film (replacing the photoelectric part of the display) of 38 μm, and the static bending and dynamic bending test were executed in accordance with the method described hereinafter.

Storage Modulus (G'), Loss Modulus (G") and Loss Tangent (Tan δ) Measurement

The obtained optical laminate film was cut into a size of 10 mm×8 mm for test sample. Storage modulus (G) and loss modulus (G") were measured at 30° C. and 80° C. by a dynamic viscoelasticity tester (Rheogel-E4000, available from UBM Co., Japan) at a frequency of 0.1/1 Hz, a rage of temperatures of 25~110° C. and a heating rate of 3° C./minute Static Bending Test The obtained optical laminate film was cut into a rectangular of 10 mm×120 mm for test sample, and the test sample was installed in a tension-free U-shaped folding tester (DLDMLH-FS, available from Yuasa System, Japan), and the minimum distance between the two sides of the folding tester was 4 mm, which refers to the outer diameter (Φ) and the radius (R) of the bending part was respectively 4 mm and 2 mm. The test samples were executed static inward bending test and outward bending test, that was, folding the test samples towards the side of the polarizer for inward bending test and towards the side of the polyester film for outward bending test. The folded test samples were placed at room temperature for 7 days, and the angles of retracting between the sample after unfolding and the flat were measured and the results are recorded in Table 3. The criteria of recording as below. ⊚: the angles of retracting less than 30°; ○: the angles of retracting between 30° to 39°; Δ: the angles of retracting between 40° to 49°; X: the angles of retracting more than 50°.

Dynamic Inward Bending Test

The obtained optical laminate film was cut into a rectangular of 10 mm×120 mm and the short sides thereof were fixed by tape to prepare test samples. Installing the test sample in a tension-free U-shaped folding tester (DLDMLH-FS, available from Yuasa System, Japan), and the outer diameter (Φ) and the radius (R) of the bending part was set up respectively 4 mm and 2 mm, folding the test samples towards the side of the polarizer for 180° dynamic inward bending test of 200 thousand times, and test samples was checked if there were splits or cracks during the test. If there were no splits or cracks, it was marked as "○"; if there were any splits or cracks, it was marked as "X".

Dynamic Outward Bending Test

The obtained optical laminate film was cut into a rectangular of 10 mm×120 mm and the short sides thereof were fixed by tape to prepare test samples. Installing the test sample in a tension-free U-shaped folding tester (DLDMLH-FS, available from Yuasa System, Japan), and the outer diameter (Φ) and the radius (R) of the bending part was set up respectively 6 mm and 4 mm, folding the test samples towards the side of the polyester film for 180° dynamic outward bending test of 200 thousand times, and test samples was checked if there were splits or cracks during the test. If there were no splits or cracks, it was marked as "○"; if there were any splits or cracks, it was marked as "X".

Example 7: Preparation of Adhesive Composition

A (meth)acrylate polymer was obtained as the same manner as the Example 6, and 0.3 parts by weight of diisocyanate-trimethylolpropane (AD75), 0.2 parts by weight of zirconium metal chelate (K-KAT 4205) and 6 parts by weight of siloxane copolymer II of Preparation Example 2 were added to the 100 parts by weight of (meth)acrylate polymer and mixed evenly to obtain the (meth)acrylate adhesive composition.

The obtained (meth)acrylate adhesive composition was tested according to the test method of Example 6. The test results were shown in Table 3.

TABLE 3

The test results of Examples 6 to 7

| | | Example 6 | Example 7 |
|---|---|---|---|
| Storage modulus G' | 30° C. (MPa) | 0.0418 | 0.0486 |
| | 80° C. (MPa) | 0.0162 | 0.0120 |
| Loss modulus G" | 30° C. (MPa) | 0.0139 | 0.0141 |
| | 80° C. (MPa) | 0.0630 | 0.0692 |
| Loss tangent | Tanδ (30° C.) | 0.333 | 0.290 |
| | Tanδ (80° C.) | 0.390 | 0.329 |
| Static bending R = 2 mm | inward | ◉ | ◉ |
| | outward | ◉ | ◉ |
| Dynamic bending inward R = 2 mm | inward | ○ | ○ |
| Dynamic bending outward R = 4 mm | outward | ○ | ○ |

As shown in Table 3, the present (meth)acrylate adhesive compositions provides good adhesions even after static bending and dynamic bending tests, and still could restore to the state of low angles of retracting after the static bending test, showing the stable bend restoring property, so they are suitable for being applied to needs on electronic products with bending function.

According to the disclosure of the embodiments of the present invention, when the present (meth)acrylate adhesive composition is used for lamination of polarizer, it can provide improved initial adhesion strength and good rework ability, and the good adhesion of the (meth)acrylate adhesive composition can be maintained even under high temperature and high humidity, showing satisfactory weather resistance.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:
1. A (meth)acrylate adhesive composition, comprising:
a (meth)acrylate polymer;
a crosslinking agent; and
a siloxane copolymer, wherein the siloxane copolymer comprising:
70 to 95 weight percent of the acrylic monomers containing $C_1$-$C_4$ alkyl group; and
5 to 30 weight percent of the silane compound represented by the following formula (I):

$$X-R^1-SiR^2_{3-a}(OR^3)_a \qquad (I)$$

wherein X is an acrylic group or (meth)acrylic group, $R^1$ is an $C_1$-$C_8$ alkyl group or alkoxy group, $R^2$ and $R^3$ is an $C_1$-$C_4$ alkyl group respectively, a is an integer of 1 to 3, and the weight-average molecular weight of the siloxane copolymer is ranging between 40,000 and 150,000;
wherein the usage amount of the siloxane copolymer is between 0.2 parts to 25 parts by weight per hundred parts by weight of the (meth)acrylate polymer.

2. The (meth)acrylate adhesive composition as claimed in claim 1, wherein the glass transition temperature of the siloxane copolymer is ranging between −22° C. and −40° C.

3. The (meth)acrylate adhesive composition as claimed in claim 1, wherein the silane compound represented by formula (I) is 3-(Methacryloxy)propyltrimethoxysilane.

4. The (meth)acrylate adhesive composition as claimed in claim 1, wherein the acrylic monomer comprises a butyl acrylate monomer and an acrylate monomer selected from one of a group consisting of methyl acrylate monomers, ethyl acrylate monomers and propyl acrylate monomers.

5. The (meth)acrylate adhesive composition as claimed in claim 4, wherein the ratio of the amount of the butyl acrylate monomer to the acrylate monomer is ranging between 0.6 and 1.5.

6. The (meth)acrylate adhesive composition as claimed in claim 1, wherein the weight-average molecular weight of the siloxane copolymer is ranging between 50,000 and 140,000.

7. The (meth)acrylate adhesive composition as claimed in claim 1, wherein the difference between the glass transition temperature of the (meth)acrylate polymer and the glass transition temperature of the siloxane copolymer is ranging between 3° C. and 15° C.

8. The (meth)acrylate adhesive composition as claimed in claim 1, wherein the siloxane copolymer further comprises a chain transfer agent.

9. The (meth)acrylate adhesive composition as claimed in claim 1, wherein the (meth)acrylate polymer comprises a (meth)acrylate monomer and a crosslinkable monomer.

10. The (meth)acrylate adhesive composition as claimed in claim 9, wherein the amount of the (meth)acrylate monomers is ranging between 90 to 99.8 weight percent of the total amount of the (meth)acrylate monomers and the crosslinkable monomers.

11. The (meth)acrylate adhesive composition as claimed in claim 10, wherein the amount of the (meth)acrylate monomers is ranging between 94 to 99.5 weight percent of the total amount of the (meth)acrylate monomers and the crosslinkable monomers.

12. The (meth)acrylate adhesive composition as claimed in claim 9, wherein the amount of the crosslinkable monomers is ranging between 0.2 to 10 weight percent of the total amount of the (meth)acrylate monomers and the crosslinkable monomers.

13. The (meth)acrylate adhesive composition as claimed in claim 12, wherein the amount of the crosslinkable monomers is ranging between 0.5 to 6 weight percent of the total amount of the (meth)acrylate monomers and the crosslinkable monomers.

14. The (meth)acrylate adhesive composition as claimed in claim 9, wherein the (meth)acrylate polymer further comprises a free radical reactive monomer, wherein the amount of the free radical reactive monomers is ranging between 0.5 to 10 parts by weight per hundred parts by weight of the (meth)acrylate monomers and the crosslinkable monomers.

* * * * *